(12) United States Patent
Honmura et al.

(10) Patent No.: US 8,139,445 B2
(45) Date of Patent: Mar. 20, 2012

(54) STEPPING MOTOR CONTROL CIRCUIT AND ANALOG ELECTRONIC WATCH

(75) Inventors: Keishi Honmura, Chiba (JP); Saburo Manaka, Chiba (JP); Kosuke Yamamoto, Chiba (JP); Akira Takakura, Chiba (JP); Kenji Ogasawara, Chiba (JP); Kazumi Sakumoto, Chiba (JP); Kazuo Kato, Chiba (JP); Takanori Hasegawa, Chiba (JP)

(73) Assignee: Seiko Instruments Inc. (JP)

( * ) Notice: Subject to any disclaimer, the term of this patent is extended or adjusted under 35 U.S.C. 154(b) by 168 days.

(21) Appl. No.: 12/661,359

(22) Filed: Mar. 16, 2010

(65) Prior Publication Data
US 2010/0238767 A1   Sep. 23, 2010

(30) Foreign Application Priority Data
Mar. 17, 2009   (JP) .................................. 2009-064819

(51) Int. Cl.
*G06F 1/04* (2006.01)
*G04F 5/00* (2006.01)
*H02P 8/00* (2006.01)

(52) U.S. Cl. .......................... 368/157; 368/160; 318/696

(58) Field of Classification Search .................. 368/155, 368/157, 160; 318/696
See application file for complete search history.

(56) References Cited

U.S. PATENT DOCUMENTS

| 4,192,131 | A | * | 3/1980 | Hosokawa et al. | 368/157 |
| 4,323,834 | A | * | 4/1982 | Xuan et al. | 318/696 |
| 4,326,278 | A | * | 4/1982 | Shida et al. | 368/157 |
| 4,340,946 | A | * | 7/1982 | Kanno et al. | 368/76 |
| 4,433,401 | A | * | 2/1984 | Shida et al. | 368/204 |
| 4,460,282 | A | * | 7/1984 | Kanno | 368/157 |
| 4,556,836 | A | * | 12/1985 | Antognini | 318/696 |
| 5,933,392 | A | * | 8/1999 | Sato et al. | 368/157 |
| 6,108,279 | A | * | 8/2000 | Hara | 368/157 |
| 2008/0089183 | A1 | | 4/2008 | Manaka et al. | 368/202 |

* cited by examiner

*Primary Examiner* — Vit Miska
(74) *Attorney, Agent, or Firm* — Adams & Wilks (57) ABSTRACT

A stepping motor control circuit includes a rotation detecting means which detects an induced signal generated by rotation of a rotor of a stepping motor, and detects a rotation state of the stepping motor according to whether the induced signal exceeds a predetermined reference threshold voltage in a predetermined detection section, and a control means which controls driving of the stepping motor by using any one of a plurality of main driving pulses having energies different from each other or a correction driving pulse with energy higher than energy of each main driving pulse according to a detection result of the rotation detecting means. The detection section is divided into a first section immediately after driving by the main driving pulse, a second section after the first section and a third section after the second section. During the driving of the stepping motor by the main driving pulse, when the rotation detecting means has detected an induced signal exceeding a first reference threshold voltage in the first section and the second section, if an induced signal exceeding a second reference threshold voltage lower than the first reference threshold voltage is not detected in the third section, the control means drives the stepping motor by using the correction driving pulse.

12 Claims, 4 Drawing Sheets

STEPPING MOTOR CONTROL CIRCUIT AND ANALOG ELECTRONIC WATCH

BACKGROUND OF THE INVENTION

1. Field of the Invention

The present invention relates to a stepping motor control circuit and an analog electronic watch using the same.

2. Description of the Related Art

In the related art, a 2 pole PM (Permanent Magnet) type stepping motor is used for an analog electronic watch and the like. The stepping motor includes a stator provided with a rotor receiving hole and a position determining portion for determining a stop position of a rotor, the rotor provided in the rotor receiving hole, and a coil. Further, the stepping motor rotates the rotor by magnetic flux generated in the stator by an alternating signal supplied to the coil, and stops the rotor at a position corresponding to the position determining portion.

As a low consumption driving scheme for the 2 pole PM type stepping motor, a correction driving scheme of a stepping motor has been put to practical use, which uses a main driving pulse P1 with low energy in a normal time, and a correction driving pulse P2 with high energy for performing driving in load variation. The energy of the main driving pulse P1 is reduced/increased according to rotation/non-rotation of a rotor, so that the stepping motor is driven with lower energy as much as possible (for example, refer to JP-B-61-15385).

The correction driving scheme is performed as follows: (1) the main driving pulse P1 is output to one pole O1 of a coil, and an induced voltage generated in the coil is detected by rotor vibration immediately after the main driving pulse P1 is output thereto; (2) the case in which the induced voltage exceeds a reference threshold voltage arbitrarily set is regarded as rotation, the main driving pulse P1 maintaining the energy is output to the other pole O2 of the driving coil, and the output of the main driving pulse P1 is repeated by a certain number of times so long as the rotor is rotated. If the number of times of output thereof reaches the certain number of times (PCD), the main driving pulse P1 with lower energy is output to the other pole O2, and this process is repeated again; and (3) the case in which the induced voltage does not exceed the reference threshold voltage is regarded as non-rotation, the correction driving pulse P2 with high energy is immediately output to the same pole, so that the rotor is forcibly rotated. In the next driving, a main driving pulse P1 with energy higher than the main driving pulse P1, which causes the non-rotation of the rotor, is output to the other pole, and the steps (1) to (3) are repeated.

Further, in the invention according to WO2005/119377, when detecting the rotation of the stepping motor, in addition to the detection of the induced signal, after a means is provided to compare a detection time with a reference time and the stepping motor is rotated by the main driving pulse P11, the correction driving pulse P2 is output if a detection signal is less than a predetermined reference threshold voltage Vcomp, and a next main driving pulse P1 is changed (pulse up) to a main driving pulse P12 having energy higher than that of the main driving pulse P11 so that the stepping motor is driven by the main driving pulse P12. If the detection time when the stepping motor has been rotated by the main driving pulse P12 is earlier than the reference time, the main driving pulse P12 is changed (pulse down) to the main driving pulse P11, so that the stepping motor is rotated by the main driving pulse P1 according to a load during the driving thereof, resulting in reduction of current consumption.

However, when the stepping motor is used for an analog electronic watch, the rotation or non-rotation state occurs according to the driving pulse as described above. However, when force acting on the rotor is significantly changed as in the case of calendar feed or variation in supply voltage, a case may occur in which the rotor infrequently stays in an intermediate position different from a stationary position, so called a case may occur in which the rotor is in an intermediate stationary position, a problem may occur in which rotation or non-rotation is abnormally determined, or hand movement delay may occur.

SUMMARY OF THE INVENTION

It is an aspect of the invention to accurately determine a rotation state of a stepping motor to perform a reliable and stable correction operation.

That is, according to the aspect of the invention, a stepping motor control circuit includes: a rotation detecting means which detects an induced signal generated by rotation of a rotor of a stepping motor, and detects a rotation state of the stepping motor according to whether the induced signal exceeds a predetermined reference threshold voltage in a predetermined detection section, and a control means which controls driving of the stepping motor by using any one of a plurality of main driving pulses having energies different from each other or a correction driving pulse with energy higher than energy of each main driving pulse according to a detection result of the rotation detecting means, wherein the detection section is divided into a first section immediately after driving by the main driving pulse, a second section after the first section and a third section after the second section, and, during the driving of the stepping motor by the main driving pulse, when the rotation detecting means has detected an induced signal exceeding a first reference threshold voltage in the first section and the second section, if an induced signal exceeding a second reference threshold voltage lower than the first reference threshold voltage is not detected in the third section, the control means drives the stepping motor by using the correction driving pulse.

During the driving of the stepping motor by a main driving pulse, when the rotation detecting means has detected the induced signal exceeding the first reference threshold voltage in the first section and the second section of the detection section, if the induced signal exceeding the second reference threshold voltage lower than the first reference threshold voltage cannot be detected in the third section, the control means drives the stepping motor by using the correction driving pulse.

Further, after the stepping motor is driven by the correction driving pulse, the control means may allow the main driving pulse to be up.

Further, when the rotation detecting means has detected the induced signal exceeding the second reference threshold voltage in the third section, the control means may not drive the stepping motor by using the correction driving pulse.

Furthermore, when the rotation detecting means has detected the induced signal exceeding the second reference threshold voltage in the third section so that the stepping motor is not driven by the correction driving pulse, the control means may not change the main driving pulse.

In addition, according to the invention, there is provided an analog electronic watch including a stepping motor for rotating time hands and a stepping motor control circuit for controlling the stepping motor, wherein the above-described stepping motor control circuit is used as the stepping motor control circuit.

According to the stepping motor control circuit of the present embodiment, the rotation state of the stepping motor can be accurately determined and a reliable and stable correction operation can be performed.

Further, according to the analog electronic watch of the present embodiment, the rotation state of the stepping motor can be accurately determined and a reliable and stable correction operation can be performed, so that hand movement can be accurately performed.

DETAILED DESCRIPTION OF THE INVENTION

Hereinafter, a stepping motor control circuit and an analog electronic watch using the same according to an embodiment of the invention will be described. In each drawing, the same reference numerals are used to designate the same elements.

Figure 1:
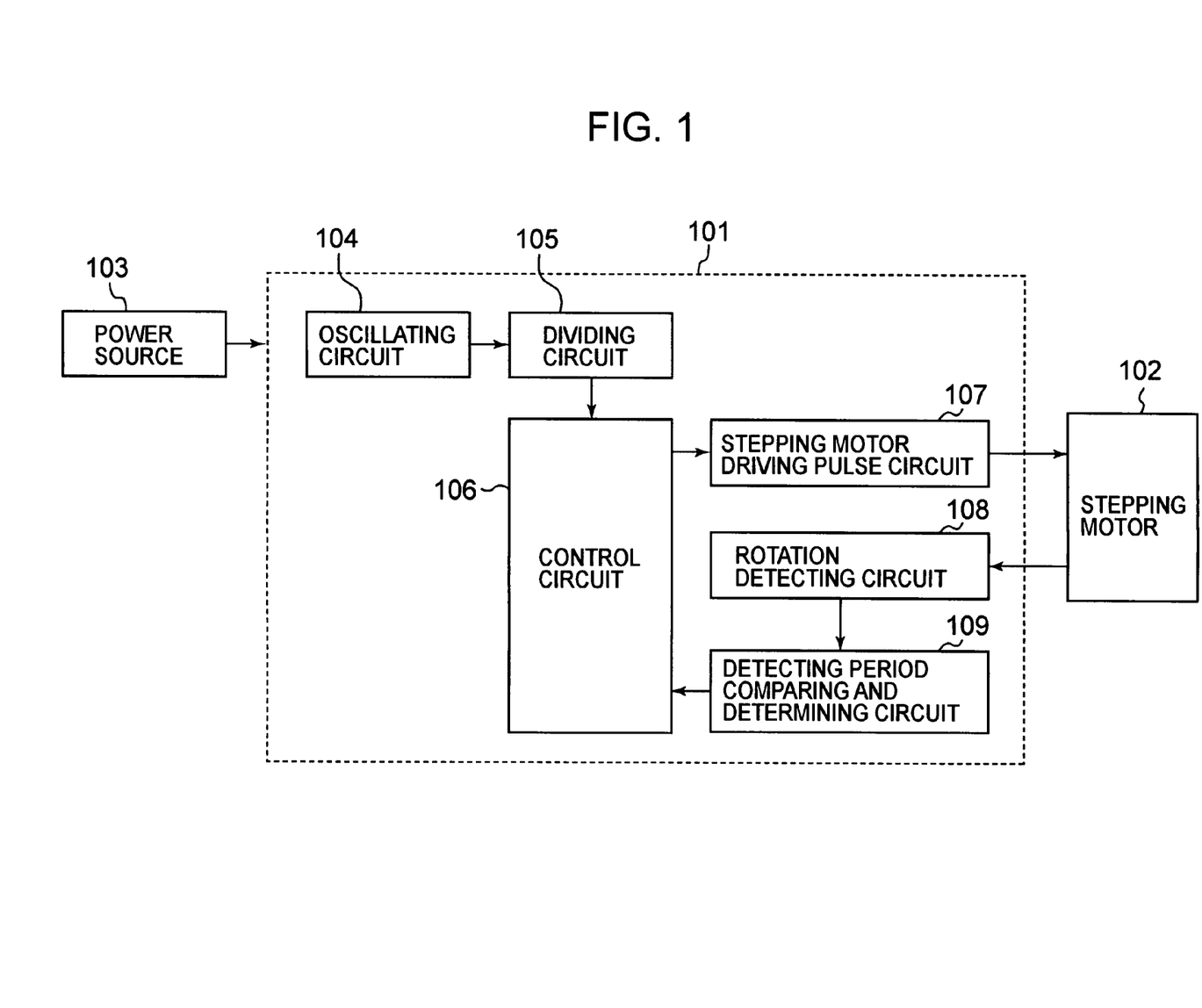
FIG. 1 is a block diagram illustrating a stepping motor control circuit and an analog electronic watch according to an embodiment of the invention.

FIG. 1 is a block diagram illustrating an analog electronic watch using the stepping motor control circuit according to the embodiment of the invention, which illustrates an example of an analog electronic wrist watch.

In FIG. 1, the analog electronic watch includes a stepping motor control circuit 101, a stepping motor 102 which is rotated under the control of the stepping motor control circuit 101 to rotate time hands, a calendar mechanism (not shown) and the like, and a power supply 103, such as a battery, which supplies driving power to circuit elements such as the stepping motor control circuit 101 and the stepping motor 102.

The stepping motor control circuit 101 includes an oscillating circuit 104 for generating a signal with a predetermined frequency, a divider circuit 105 for dividing the signal generated by the oscillating circuit 104 to generate a watch signal serving as a reference of a watch, a control circuit 106 for controlling electronic circuit elements constituting the electronic watch or controlling the change of a driving pulse, a stepping motor driving pulse circuit 107 for selectively outputting a driving pulse for driving the rotation of a motor to the stepping motor 102 based on a control signal from the control circuit 106, a rotation detecting circuit 108 for detecting an induced signal, which represents a rotation state, from the stepping motor 102 in a predetermined detection section, and a detection time comparing/determining circuit 109 for determining a detection section of the induced signal by performing a comparison operation based on a time and a section at which the rotation detecting circuit 108 has detected the induced signal exceeding a predetermined reference threshold voltage. Further, as described later, a detection section used for detecting the rotation state of the stepping motor 102 is divided into three sections.

The rotation detecting circuit 108 has the same configuration as that of a rotation detecting circuit according to JP-B-61-15385. The rotation detecting circuit 108 detects whether the induced signal generated by free vibration immediately after the driving of the stepping motor 102 exceeds a predetermined reference threshold voltage Vcomp in a predetermined detection section, and gives notice to the detection time comparing/determining circuit 109 whenever detecting an induced signal VRs exceeding the reference threshold voltage Vcomp. According to the present embodiment, the reference threshold voltage Vcomp uses two types of the reference threshold voltage Vcomp having voltages different from each other, that is, a first reference threshold voltage Vcomp1 of a first predetermined voltage and a second reference threshold voltage Vcomp2, which is a second predetermined voltage lower than the first reference threshold voltage Vcomp1, and the reference threshold voltage is selectively used according to the rotation state of the stepping motor.

In addition, the oscillating circuit 104 and the divider circuit 105 constitute a signal generating means. The rotation detecting circuit 108 and the detection time comparing/determining circuit 109 constitute a rotation detecting means. Further, the oscillating circuit 104, the divider circuit 105, the control circuit 106 and the stepping motor driving pulse circuit 107 constitute a control means.

The rotation detecting means can detect the induced signal VRs generated by the rotation of the rotor of the stepping motor 102, and detect the rotation state of the stepping motor 102 according to whether the induced signal VRs exceeds the predetermined reference threshold voltage in a predetermined detection section.

During the driving of the stepping motor 102 by a main driving pulse P1, when the rotation detecting means has detected the induced signal VRs exceeding the first reference threshold voltage Vcomp1 in a first section T1 and a second section T2 of the detection section, if the induced signal VRs exceeding the second reference threshold voltage Vcomp2 lower than the first reference threshold voltage Vcomp1 cannot be detected in a third section T3, the control means drives the stepping motor 102 by using a correction driving pulse P2.

Figure 2:
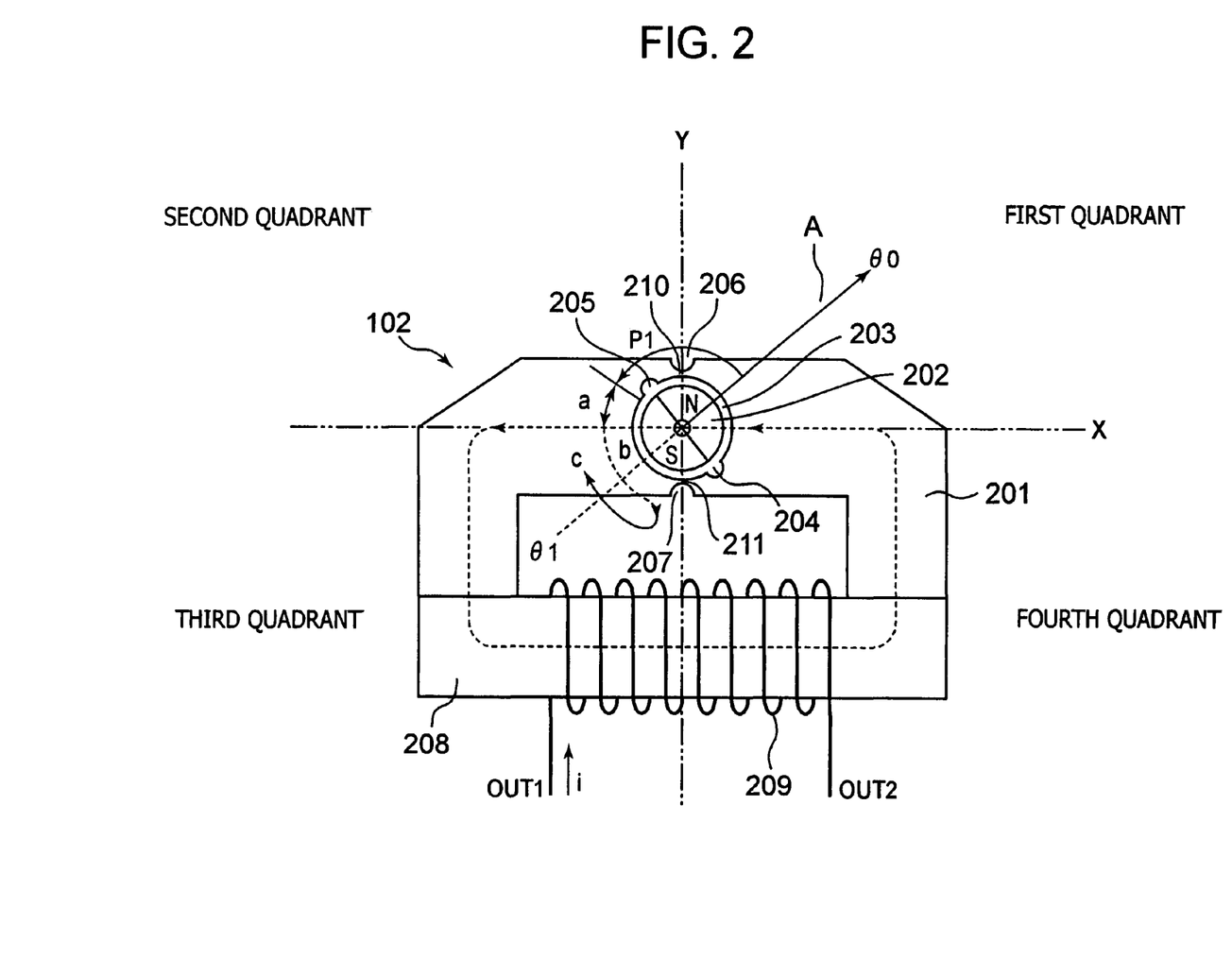
FIG. 2 is a diagram illustrating the configuration of a stepping motor used for an analog electronic watch according to an embodiment of the invention.

FIG. 2 is a diagram illustrating the configuration of the stepping motor 102 used for the embodiment of the invention, which illustrates an example of a 2 pole PM type stepping motor generally used for an analog electronic watch.

In FIG. 2, the stepping motor 102 includes a stator 201 formed with a rotor receiving through hole 203, a rotor 202 rotatably provided in the rotor receiving through hole 203, a magnetic core 208 bonded to the stator 201, and a coil 209 wound around the magnetic core 208. When the stepping motor 102 is used for an analog electronic watch, the stator 201 and the magnetic core 208 are fixed to a ground plane (not shown) by screws (not shown) while being bonded to each other. The coil 209 has a primary terminal OUT1 and a secondary terminal OUT2.

The rotor 202 is magnetized to two poles (S and N poles). The stator 201 made of a magnetic material is formed at the outer end portion thereof with a plurality (two in the present embodiment) of cutout parts (outer notches) 206 and 207 which face each other while interposing the rotor receiving through hole 203 therebetween. Saturable parts 210 and 211 are provided between each of the notches 206 and 207 and the rotor receiving through hole 203.

The saturable parts 210 and 211 are not saturated by the magnetic flux of the rotor 202, but are saturated when the coil 209 is excited so that magnetic resistance becomes large. The rotor receiving through hole 203 is formed in circular hole shape in which a plurality (two in the present embodiment) of semilunar cutout parts (inner notches) 204 and 205 are integrally formed with each other at opposite positions of the through hole which is circular in outline.

The cutout parts 204 and 205 serve as position determining portions for determining a stop position of the rotor 202. In the state in which the coil 209 is not excited, the rotor 202 is stably stopped at a position corresponding to the position determining portions as illustrated in FIG. 2, in other words, a magnetic pole axis A of the rotor 202 is stably stopped at a position (position of an angle of θ0) which is perpendicular to a line segment which connects the cutout part 204 to the cutout part 205. An XY coordinate space, in which a rotation axis (rotation center) of the rotor 202 is employed as a center, is divided into four quadrants (first to fourth quadrants I to IV).

If an electric current i flows in the arrow direction of FIG. 2 by a rectangular waveform driving pulse supplied between the terminals OUT1 and OUT2 of the coil 209 from the stepping motor driving pulse circuit 107 (e.g., the primary terminal OUT1 is referred to as a positive pole and the secondary terminal OUT2 is referred to as a negative pole), magnetic flux is generated in the stator 201 in the broken line arrow direction. Therefore, the saturable parts 210 and 211 are saturated so that magnetic resistance becomes large. Thereafter, due to an interaction between magnetic poles generated in the stator 201 and the magnetic poles of the rotor 202, since the rotor 202 is rotated at an angle of 180° in the arrow direction of FIG. 2, the magnetic pole axis of the rotor 202 is stably stopped at a position of an angle of θ1. Herein, the rotation direction (the counterclockwise direction in FIG. 2), in which a normal operation (a hand moving operation in the analog electronic watch of the present embodiment) is performed by the rotation of the stepping motor 102, will be referred to as the forward direction, and the opposite (the clockwise direction) will be referred to as the backward direction.

Next, if an electric current flows in the opposite arrow direction of FIG. 2 by a rectangular waveform driving pulse having a reverse polarity supplied between the terminals OUT1 and OUT2 of the coil 209 from the stepping motor driving pulse circuit 107 (the primary terminal OUT1 is referred to as a negative pole and the secondary terminal OUT2 is referred to as a positive pole such that reverse polarity occurs as compared with the above driving), magnetic flux is generated in the stator 201 in the direction opposite to the broken line arrow direction. Therefore, the saturable parts 210 and 211 are first saturated. Thereafter, due to the interaction between the magnetic poles generated in the stator 201 and the magnetic poles of the rotor 202, since the rotor 202 is rotated at the angle of 180° in the same direction (forward direction) as that in the above case, the magnetic pole axis of the rotor 202 is stably stopped at a position of the angle of θ0.

Then, the above operation is repeated by supplying the coil 209 with signals (alternating signals) having different polarities, so that the rotor 202 can be continuously rotated by 180° in the arrow direction. According to the present embodiment, as described later, a plurality of main driving pulses P10 to P1n having different energies and a correction driving pulse P2 are used as the driving pulse.

Figure 3:
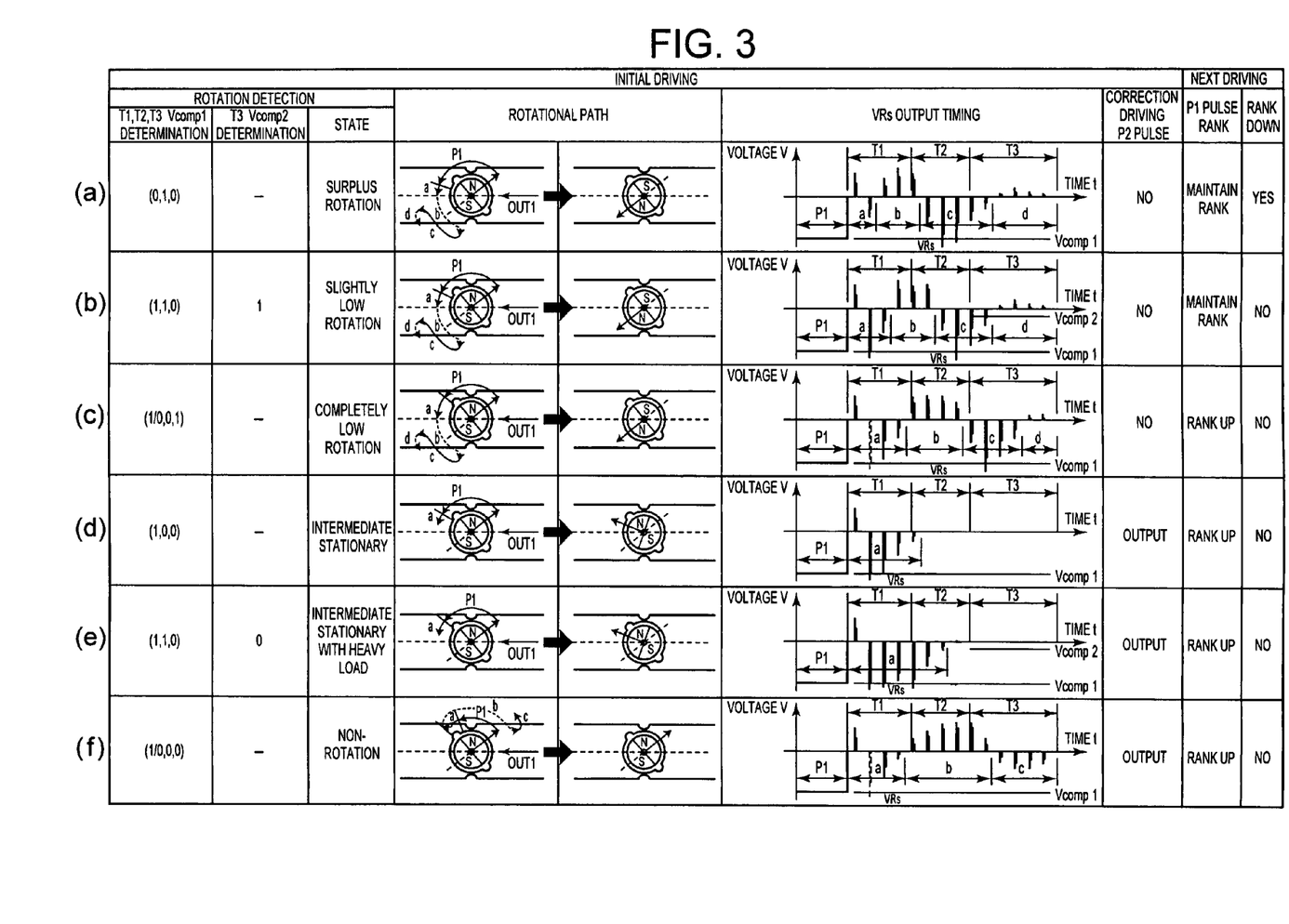
FIG. 3 is a timing diagram illustrating the operations of a stepping motor control circuit and an analog electronic watch according to an embodiment of the invention.

FIG. 3 is a timing diagram when the stepping motor 102 is driven by the main driving pulse P1 according to the present embodiment, which collectively illustrates a detection pattern (determination value representing whether the induced signal VRs of the sections T1 to T3 exceeds the reference threshold voltage Vcomp) representing a rotation state, the rotation position of the rotor 202, and a pulse control operation of changing the rank of the main driving pulse P1 or performing driving by the correction driving pulse P2.

In FIG. 3, P1 denotes both the main driving pulse P1 and a section in which the rotor 202 is rotated by the main driving pulse P1, and "a" to "d" denote regions representing the rotation positions of the rotor 202 by free vibration after driving of the main driving pulse P1 is stopped.

A predetermined time immediately after driving by the main driving pulse P1 is defined as a first section T1, a predetermined time after the first section T1 is defined as a second section T2, and a predetermined time after the second section T2 is defined as a third section T3. In this way, the entire detection section T starting from immediately after the driving by the main driving pulse P1 is divided into a plurality of sections (in the present embodiment, three sections T1 to T3). However, in the present embodiment, a mask section, in which the induced signal VRs is not detected, is not provided.

When the rotor 202 is employed as the center and the XY coordinate space, in which the main magnetic pole of the rotor 202 is located by the rotation thereof, is divided into first to fourth quadrants I to IV, the first to third sections T1 to T3 can be defined as follows.

That is, in a state of a normal load, the first section T1 serves as a section for determining the rotation state of the rotor 202 in the forward direction and the initial rotation state of the rotor 202 in the backward direction in the third quadrant III of the space employing the rotor 202 as the center, the second section T2 serves as a section for determining the initial rotation state of the rotor 202 in the backward direction in the third quadrant III, and the third section T3 serves as a section for determining a rotation state after the initial rotation of the rotor 202 in the backward direction in the third quadrant III. Herein, the normal load means a load driven in a normal time. According to the present embodiment, a load when driving time hands (an hour hand, a minute hand and a second-hand) for displaying a time is defined as the normal load.

The first reference threshold voltage Vcomp1 serves as a reference threshold voltage for determining a voltage level of the induced signal VRs generated in the stepping motor 102. When the rotor 202 performs a constant high speed operation as in the case in which the stepping motor 102 is rotated, the induced signal VRs exceeds the first reference threshold voltage Vcomp1. When the rotor 202 does not perform the constant high speed operation as in the case in which the stepping motor 102 is not rotated, the first reference threshold voltage Vcomp1 is set such that the induced signal VRs does not exceed the first reference threshold voltage Vcomp1.

Further, the second reference threshold voltage Vcomp2 is set to be lower than the first reference threshold voltage Vcomp1. When the induced signal VRs of the first and second sections T1 and T2 exceeds the voltage Vcomp1, since it is determined whether the rotor 202 is stationary in an intermediate position, the second reference threshold voltage Vcomp2 serves as a reference for determining whether the signal VRs exceeding a predetermined level has been generated in the third section T3. According to the present embodiment, for example, the first reference threshold voltage Vcomp1 is set to 1.5V and the second reference threshold voltage Vcomp2 is set to 0.3V.

In the stepping motor control circuit according to the present embodiment, in the state of the normal load, the induced signal VRs generated in the area "b" is detected in the first section T1, the induced signal VRs generated in the area "c" is detected in the first section T1 and the second section T2, and the induced signal VRs generated in the area "d" is detected in the third section T3.

Further, in the first to third sections T1 to T3, a determination value "1" is given when the induced signal VRs exceeds the reference threshold voltage Vcomp serving as a comparison reference, and a determination value "0" is given when the induced signal VRs does not exceed the reference threshold voltage Vcomp. In addition, "1/0" is given when a determination value may be any one of "1" and "0".

In FIG. 3, for example, when (0, 1, 0) is generated as a pattern (including a determination value of the first section T1, a determination value of the second section T2, and a determination value of the third section T3), the control circuit 106 determines the rotation of the rotor 202 as surplus rotation, does not perform the driving by the correction driving pulse P2, and maintains the rank of the main driving pulse P1 without changing the same. When a pattern (0, 1, 0) has been continuously generated by a predetermined number of times, the control circuit 106 determines that driving energy is left to allow the main driving pulse P1 to be down (pulse down) by one rank ((a) of FIG. 3).

In the case of a pattern (1, 1, 0), when the induced signal VRs exceeding the second reference threshold voltage Vcomp2 has been generated in the third section T3 (when a determination value through the second reference threshold voltage Vcomp2 is "1"), the control circuit 106 determines the rotation of the rotor 202 as slightly low rotation, does not perform the driving by the correction driving pulse P2, and performs pulse control of maintaining the rank of the main driving pulse P1 without changing the same ((b) of FIG. 3). When the induced signal VRs exceeding the second reference threshold voltage Vcomp2 has not been generated in the third section T3 (when a determination value through the second reference threshold voltage Vcomp2 is "0"), the control circuit 106 determines that the rotor 202 is in an intermediate stationary state with a heavy load, and allows the main driving pulse P1 to be up (pulse up) by one rank after performing the driving by the correction driving pulse P2 ((e) of FIG. 3).

In the case of a pattern (1/0, 0, 1), the control circuit 106 determines the rotation of the rotor 202 as completely low rotation, and allows the main driving pulse P1 to be up (pulse up) by one rank without performing the driving by the correction driving pulse P2 ((c) of FIG. 3).

In the case of a pattern (1, 0, 0), the control circuit 106 determines that the rotor 202 is stationary in an intermediate position, and allows the main driving pulse P1 to be up by one rank after performing the driving by the correction driving pulse P2 ((d) of FIG. 3).

In the case of a pattern (1/0, 0, 0), the control circuit 106 determines the rotation of the rotor 202 as non-rotation, and allows the main driving pulse P1 to be up by one rank after performing the driving by the correction driving pulse P2 ((f) of FIG. 3).

Figure 4:
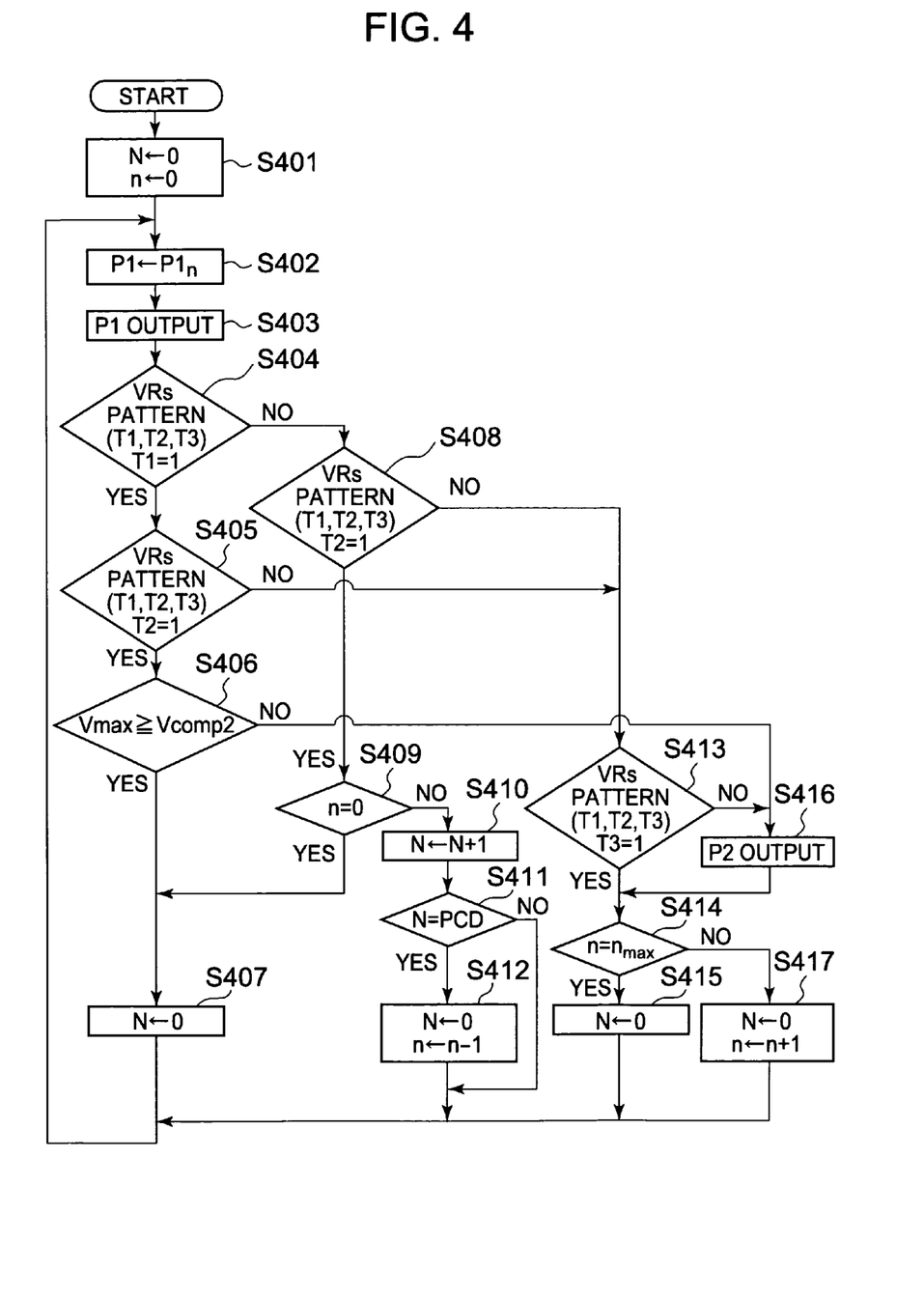
FIG. 4 is a flowchart illustrating the operations of a stepping motor control circuit and an analog electronic watch according to an embodiment of the invention.

FIG. 4 is a flowchart illustrating the operations of the stepping motor control circuit and the analog electronic watch according to the embodiment of the invention, which is a flowchart mainly illustrating the processing of the control circuit 106.

Hereinafter, the operations of the stepping motor control circuit and the analog electronic watch according to the embodiment of the invention will be described in detail with reference to FIGS. 1 to 4.

In FIG. 1, the oscillating circuit 104 generates a reference clock signal with a predetermined frequency, and the divider circuit 105 divides the signal generated by the oscillating circuit 104 to generate the watch signal serving as the reference of the watch, and outputs the watch signal to the control circuit 106.

The control circuit 106 performs a time counting operation by counting the watch signal. First, the control circuit 106 sets a rank "n" of the main driving pulse P1$n$ and the number N of times of repetition to "0" (Step S401 of FIG. 4), and outputs a control signal such that the stepping motor 102 is rotated by the main driving pulse P10 with a minimum pulse width (Steps S402 and S403).

The stepping motor driving pulse circuit 107 rotates the stepping motor 102 by using the main driving pulse P10 in response to the control signal from the control circuit 106. The stepping motor 102 is rotated by the main driving pulse P10 to rotate the time hands (not shown). In this way, when the stepping motor 102 is normally rotated, the current time display and the like is performed through the time hands.

The rotation detecting circuit 108 outputs a detection signal to the detection time comparing/determining circuit 109 whenever detecting the induced signal VRs of the stepping motor 102 exceeding the first reference threshold voltage Vcomp1. Then, the detection time comparing/determining circuit 109 determines the sections T1 to T3, in which the induced signal VRs exceeding the first reference threshold voltage Vcomp1 has been detected, based on the detection signal from the rotation detecting circuit 108, and notifies the control circuit 106 of a determination value "1" or "0" in each of the sections T1 to T3.

The control circuit 106 determines patterns (including a determination value in the first section T1, a determination value in the second section T2, and a determination value in the third section T3) (VRs patterns), which represent the rotation states, based on the determination value from the detection time comparing/determining circuit 109.

In the case in which the determination value is "1" in the first and second sections T1 and T2 of the VRs pattern as a result of the driving by the main driving pulse P10, that is, when the VRs pattern is (1, 1, 1/0) (Steps S404 and S405), when the maximum value Vmax of the induced signal VRs in the third section T3 exceeds the second reference threshold voltage Vcomp2 (Step S406), the control circuit 106 determines the rotation of the rotor 202 as the slightly low rotation other than the intermediate stationary state, maintains the rank of the main driving pulse P1 without changing the same, resets the number N of times to "0", and then returns to the process step S402 (Step S407).

When it is determined that the induced signal VRs in the third section T3 does not exceed the second reference threshold voltage Vcomp2 in the process step S406 (in the case of the pattern (1, 1, 0) representing the intermediate stationary state with the heavy load in ((e) of FIG. 3), the control circuit 106 controls the stepping motor driving pulse circuit 107 such that the stepping motor 102 is driven by the correction driving pulse P2 (Step S416). The stepping motor driving pulse circuit 107 rotates the stepping motor 102 by the correction driving pulse P2 in response to the control of the control circuit 106.

When the rank "n" of the main driving pulse P1 is the maximum rank_nmax, the control circuit 106 resets the number N of times to "0", and then returns to the process step S402 (Steps S414 and S415). When the rank "n" of the main driving pulse P1 is not the maximum rank_nmax, the control circuit 106 resets the number N of times to "0" while allowing the rank "n" of the main driving pulse P1 to be up by one rank, and then returns to the process step S402 (Steps S414 and S417).

In the case in which it is determined that the induced signal VRs in the second section T2 does not exceed the first reference threshold voltage Vcomp1 in the process step S405 (i.e., the determination values of the sections T1 and T2 are (1, 0)), when the determination value of the third section T3 is determined as "1", that is, when the VRs pattern is (1, 0, 1), the control circuit 106 proceeds to the process step S414 to perform the following pulse up control (Step S413) ((c) of FIG. 3).

When the determination value of the third section T3 is determined as "0" in the process step S413, that is, when the VRs pattern is (1, 0, 0), the control circuit 106 proceeds to the process step S416 to perform the following driving by the correction driving pulse P2 and pulse up control ((d) of FIG. 3).

In the case in which the determination value of the first section T1 is "0" and the determination value of the second section T2 is "1" in the process step S404 (Step S408), when the rank "n" of the main driving pulse P1 is the minimum value "0", the control circuit 106 proceeds to the process step S407 (Step S409). When the rank "n" of the main driving pulse P1 is not the minimum value "0", the control circuit 106 adds "1" to the number N of times (Step S410).

When the number N of times has reached a predetermined number of times (PCD) in the process step S410, the control circuit 106 resets the number N of times to "0" while allowing the rank "n" of the main driving pulse P1 to be down by one rank, and then returns to the process step S402. When the number N of times has not reached the predetermined number of times, the control circuit 106 immediately returns to the process step S402 (Steps S411 and S412).

When the determination value of the second section T2 is "0" in the process step S408, the control circuit 106 proceeds to the process step S413 and performs the above process.

As described above, in the stepping motor control circuit and the analog electronic watch according to the embodiment of the invention, the generation time of the induced signal VRs is divided into a plurality of sections (in the present embodiment, the first section T1, the second section T2 and the third section T3), the induced signal VRs is compared with the first reference threshold voltage Vcomp1 in each section, and the rotation state of the rotor is determined based on the patterns of the determination values, so that the driving pulse is controlled. For example, patterns (1/0, 1, 1/0) and (1/0, 0, 1) represent a rotation state and the pattern (1/0, 0, 0) represent a non-rotation state.

The 2 pole PM type stepping motor is in the rotation state or non-rotation state according to the driving pulse as described above. However, when force acting on the rotor is significantly changed as in the case of calendar feed or variation in supply voltage, a case may occur in which the rotor 202 infrequently stays in an intermediate position different from a stationary position, so called, a case may occur in which the rotor 202 is in an intermediate stationary position. Such a state typically represents the pattern (1, 0, 0) in the VRs pattern determination, and represents the VRs pattern as the same as that of the non-rotation state. However, such a state may represent the pattern (1, 1, 0) in the load state and represent the VRs pattern as the same as that of the rotation state. That is, although rotation cannot be normally performed, a case may occur in which it is erroneously determined as the rotor 202 having been rotated.

However, according to the present embodiment, the detection time comparing/determining circuit 109 is provided to compare the voltage value and the output time of the induced signal VRs generated by the vibration of the rotor 202 and store the voltage value and the output time as the VRs patterns. Separately from the rotation state and the non-rotation state, when variation in the rotor load is severe, the second reference threshold voltage Vcomp2 is provided only in the third section T3 of the VRs pattern in order to determine the intermediate stationary state infrequently occurring, and the energy of the driving pulse is controlled according to a specific VRs pattern and a VRs voltage value of the third section T3.

That is, in the case of the intermediate stationary, by paying attention to the fact that the rotor 202 does not completely vibrate in the third section T3, the second reference threshold voltage Vcomp2 having a level lower than that of the first reference threshold voltage Vcomp1 is set only in the third section T3, and the induced signal VRs detected in the third section T3 is determined using the second reference threshold voltage Vcomp2 only when the determination values of the first section T1 and the second section T2 are "1". As a result of the determination, when the induced signal VRs of the third section T3 is equal to or larger than the second reference threshold voltage Vcomp2, the driving by the correction driving pulse P2 is not performed. However, when the induced signal VRs of the third section T3 is smaller than the second reference threshold voltage Vcomp2, the driving by the correction driving pulse P2 is performed.

Consequently, according to the stepping motor control circuit of the present embodiment, the rotation state of the stepping motor 102 can be accurately determined and a reliable and stable correction operation can be performed.

Further, according to the analog electronic watch of the present embodiment, the rotation state of the stepping motor can be accurately determined and a reliable and stable correction operation can be performed, so that hand movement can be accurately performed.

Further, it is possible to cope with various types of movement such as a function system with a calendar load from a straight system with a small load, and battery mounting in which a voltage is changed, without changing the specification of an integrated circuit (IC) or a motor which constitutes the stepping motor control circuit 101.

Further, according to the embodiment, since the energy of each main driving pulse P1 is changed, the pulse widths thereof may be different from each other. However, the driving energy can be changed by changing a pulse voltage and the like.

Furthermore, the example of the calendar function has been described as an example of a widely fluctuating load. However, it is possible to use various types of loads such as loads which cause a predetermined operation in a character provided in the display unit to inform of a predetermined time.

In addition, the electronic watch has been described as an application of the stepping motor. However, the invention can be applied to an electronic apparatus using a motor.

The stepping motor control circuit according to the invention can be applied to various electronic apparatuses using the stepping motor.

Moreover, the electronic watch according to the invention can be applied to various analog electronic watches including an analog electronic wrist watch having a calendar function, and an analog electronic watch having various calendar functions such as an analog electronic table clock having a calendar function.

What is claimed is:

1. A stepping motor control circuit comprising:
    a rotation detecting means which detects an induced signal generated by rotation of a rotor of a stepping motor, and detects a rotation state of the stepping motor according to whether the induced signal exceeds a predetermined reference threshold voltage in a predetermined detection section; and
    a control means which controls driving of the stepping motor by using any one of a plurality of main driving pulses having energies different from each other or a correction driving pulse with energy higher than energy of each main driving pulse according to a detection result of the rotation detecting means,
    wherein the detection section is divided into a first section immediately after driving by the main driving pulse, a second section after the first section and a third section after the second section, and during the driving of the stepping motor by the main driving pulse, when the rotation detecting means has detected an induced signal exceeding a first reference threshold voltage in the first section and the second section, if an induced signal exceeding a second reference threshold voltage lower than the first reference threshold voltage is not detected in the third section, the control means drives the stepping motor by using the correction driving pulse.

2. The stepping motor control circuit according to claim 1, wherein, after the stepping motor is driven by the correction driving pulse, the control means allows the main driving pulse to be up.

3. The stepping motor control circuit according to claim 1, wherein, when the rotation detecting means has detected the induced signal exceeding the second reference threshold voltage in the third section, the control means does not drive the stepping motor by using the correction driving pulse.

4. The stepping motor control circuit according to claim 2, wherein, when the rotation detecting means has detected the induced signal exceeding the second reference threshold voltage in the third section, the control means does not drive the stepping motor by using the correction driving pulse.

5. The stepping motor control circuit according to claim 3, wherein, when the rotation detecting means has detected the induced signal exceeding the second reference threshold voltage in the third section so that the stepping motor is not driven by the correction driving pulse, the control means does not change the main driving pulse.

6. The stepping motor control circuit according to claim 4, wherein, when the rotation detecting means has detected the induced signal exceeding the second reference threshold voltage in the third section so that the stepping motor is not driven by the correction driving pulse, the control means does not change the main driving pulse.

7. An analog electronic watch including a stepping motor for rotating time hands and a stepping motor control circuit for controlling the stepping motor, wherein the stepping motor control circuit according to claim 1 is used as the stepping motor control circuit.

8. An analog electronic watch including a stepping motor for rotating time hands and a stepping motor control circuit for controlling the stepping motor, wherein the stepping motor control circuit according to claim 2 is used as the stepping motor control circuit.

9. An analog electronic watch including a stepping motor for rotating time hands and a stepping motor control circuit for controlling the stepping motor, wherein the stepping motor control circuit according to claim 3 is used as the stepping motor control circuit.

10. An analog electronic watch including a stepping motor for rotating time hands and a stepping motor control circuit for controlling the stepping motor, wherein the stepping motor control circuit according to claim 4 is used as the stepping motor control circuit.

11. An analog electronic watch including a stepping motor for rotating time hands and a stepping motor control circuit for controlling the stepping motor, wherein the stepping motor control circuit according to claim 5 is used as the stepping motor control circuit.

12. An analog electronic watch including a stepping motor for rotating time hands and a stepping motor control circuit for controlling the stepping motor, wherein the stepping motor control circuit according to claim 6 is used as the stepping motor control circuit.

* * * * *